US012797995B2

(12) United States Patent
Baumann et al.

(10) Patent No.: US 12,797,995 B2
(45) Date of Patent: Nov. 17, 2026

(54) WELDING METHOD

(71) Applicant: Fronius International GmbH, Pettenbach (AT)

(72) Inventors: Willi Baumann, Wels-Thalheim (AT); Andreas Waldhör, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 942 days.

(21) Appl. No.: 18/007,605

(22) PCT Filed: Jun. 1, 2021

(86) PCT No.: PCT/EP2021/064669
§ 371 (c)(1),
(2) Date: Dec. 1, 2022

(87) PCT Pub. No.: WO2021/245077
PCT Pub. Date: Dec. 9, 2021

(65) Prior Publication Data

US 2023/0286076 A1 Sep. 14, 2023

(30) Foreign Application Priority Data

Jun. 2, 2020 (EP) .................................... 20177795

(51) Int. Cl.
*B23K 15/00* (2006.01)
*B23K 9/095* (2006.01)
(Continued)

(52) U.S. Cl.
CPC ........ *B23K 15/0073* (2013.01); *B23K 9/0956* (2013.01); *B23K 26/032* (2013.01);
(Continued)

(58) Field of Classification Search
CPC ......................... B23K 15/0073; B23K 9/0956; B23K 26/032; B23K 26/1464; B23K 31/125;
(Continued)

(56) References Cited

U.S. PATENT DOCUMENTS 4,742,207 A 5/1988 Nakashima et al.
10,373,517 B2 * 8/2019 Becker .................. G09B 19/24
(Continued)

FOREIGN PATENT DOCUMENTS

CN 101062529 10/2007
CN 105345237 2/2016
(Continued)

OTHER PUBLICATIONS

Machine English translation of EP-3107682-B1 (Year: 2018).*
(Continued)

*Primary Examiner* — Erwin J Wunderlich
(74) *Attorney, Agent, or Firm* — GREENBLUM & BERNSTEIN, P.L.C.

(57) ABSTRACT

A welding method materially cohesively bonding at least two components using at least one additive material. A welding seam is produced with a seam course between a seam start and a seam end. The process is controlled using at least one control unit at least one external physical welding seam property of the welding seam is influenced by a control parameter of the control unit, and information is included in the control parameter. The information, during the process, is stored in the welding seam between a start point and an end point in the seam course using the at least one external physical welding seam property so that the information can be read, optically and/or haptically, from a sequence of the at least one external physical welding seam property along the course of the seam in the region between the start point and the end point.

18 Claims, 2 Drawing Sheets

Figure 1:
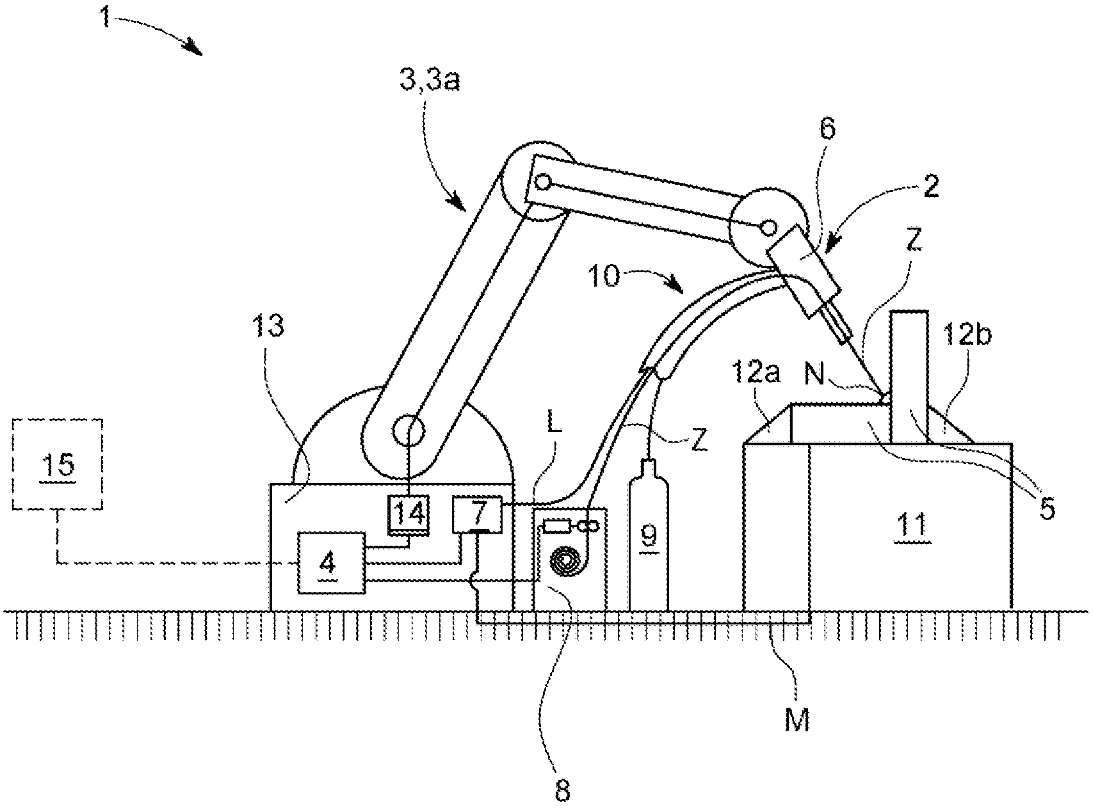

(51) Int. Cl.

| | |
|---|---|
| ***B23K 15/02*** | (2006.01) |
| ***B23K 26/03*** | (2006.01) |
| ***B23K 26/14*** | (2014.01) |
| ***B23K 26/21*** | (2014.01) |
| ***B23K 31/12*** | (2006.01) |
| ***G01V 15/00*** | (2006.01) |
| *B41J 3/413* | (2006.01) |

(52) U.S. Cl.
CPC ........ *B23K 26/1464* (2013.01); *B23K 31/125* (2013.01); *G01V 15/00* (2013.01); *B23K 15/02* (2013.01); *B23K 26/21* (2015.10); *B41J 3/413* (2013.01)

(58) Field of Classification Search
CPC ........ B23K 15/02; B23K 26/21; G01V 15/00; B41J 3/413
See application file for complete search history.

(56) References Cited

U.S. PATENT DOCUMENTS

| | | | | |
|---|---|---|---|---|
| 11,585,788 | B2 * | 2/2023 | Feuilly | G01N 29/225 |
| 2001/0029989 | A1 * | 10/2001 | Paz | F16L 1/11 138/104 |
| 2011/0042361 | A1 | 2/2011 | Nowak et al. | |
| 2014/0008415 | A1 * | 1/2014 | Shen | B23K 9/0216 228/10 |
| 2014/0326507 | A1 * | 11/2014 | Spriggs | E21B 17/006 175/40 |
| 2016/0039034 | A1 * | 2/2016 | Becker | B23K 9/0953 219/136 |
| 2019/0093828 | A1 * | 3/2019 | Bovero | F16L 13/0272 |

FOREIGN PATENT DOCUMENTS

| | | | | |
|---|---|---|---|---|
| CN | 107803606 | | 3/2018 | |
| CN | 110385505 | | 10/2019 | |
| EP | 1 674 191 | | 6/2006 | |
| EP | 3107682 | B1 * | 4/2018 | G03B 42/047 |
| JP | 1089923 | | 4/1998 | |
| JP | 2002-239726 | | 8/2002 | |
| JP | 2011-041982 | | 3/2011 | |
| KR | 10-2011-0001638 | | 1/2011 | |
| WO | 2015/124870 | | 8/2015 | |

OTHER PUBLICATIONS

China Office Action (OA) conducted in counterpart China Appln. No. 202180040161.1 (Nov. 13, 2024).
Japan Office Action conducted in counterpart Japan Appln. No. 2022/574147 (Jan. 15, 2024).
Int'l Search Report (form PCT/ISA/210) conducted in Int'l Appln. No. PCT/EP2021/064669 (Aug. 11, 2021).
Int'l Written Opinion (form PCT/ISA/237) conducted in Int'l Appln. No. PCT/EP2021/064669 (Aug. 11, 2021).
Int'l Prelim. Exam. Report (form PCT/IPEA/409) conducted in Int'l Appln. No. PCT/EP2021/064669 (Aug. 11, 2021).

* cited by examiner

WELDING METHOD

The invention relates to a welding method for materially cohesively bonding at least two components using at least one additive material, wherein a welding seam consisting of the additive material is produced with a specified seam course between a seam start and a seam end, wherein the process of producing of the welding seam is controlled by at least one control unit, wherein at least one detectable external physical welding seam property of the welding seam is influenced by at least one control parameter of the control unit.

A known method for materially cohesive bonding components is the welding method. A metallic filler material is used when welding metallic components. In this case, the filler material and also the components are at least in part melted while energy is introduced and after cooling, the components are bonded by the filler material.

A distinction is made between different welding methods depending on how the energy is supplied to the welding point. In arc welding electrical energy is used, for example, to produce an arc between a welding electrode and the components to be welded, which melts the filler material and the components. In this case, consumable electrodes can be used, which themselves simultaneously form the filler material. However, non-consumable electrodes can also be used, wherein the filler material is supplied separately. These methods are also known, for example, as MIG/MAG welding methods or TIG welding methods, wherein an active or inert protective gas is usually used to protect the weld from corrosion. However, the welding energy can also be introduced by means of a laser or by means of an electron beam, which is then referred to as laser welding or electron beam welding. Mixed forms are also possible in which the laser is used, for example, as an additional energy source.

The additive material is applied in the form of a welding seam that is produced along a specific seam course. The seam course of the seam is substantially specified by the component geometry and can extend, for example, from a specific start point to a specific end point.

The aforementioned welding methods can in principle be carried out manually, for example by a person manually moving a welding torch relative to the workpiece. In order to achieve results that are as uniform and reproducible as possible when producing a welding seam, the welding seam is preferably produced in an automated manner using a suitable device. The device comprises at least one manipulation unit and a welding unit that is moved by the manipulation unit. For example, a manipulation unit can be provided by means of which one (or more) welding units can be moved at least one-dimensionally relative to the components to be bonded.

In order to be able to produce more complex multidimensional seam courses, a multi-axis robot is preferably provided as a manipulation unit. In the case of welding methods, a welding robot is often used, for example, which welding robot guides one (or more) welding torch(es). Depending on the welding method used, the additive material(s) can be fed directly to the welding point by means of the welding unit or also by means of a separate feed unit. In the known MIG/MAG welding method, the additive material is supplied to the welding point, for example, integrally in the welding torch in the form of a melting welding wire. In the case of TIG welding, however, a separate supply unit is provided, by means of which the filler material can be fed to the welding point at a specific adjustable, in particular controllable feed rate.

The device also has at least one control unit with which the welding method can be controlled. Of course, a plurality of control units can also be provided that communicate with one another in a suitable manner, for example a control unit of the welding unit and a control unit of the manipulation unit. In the control unit(s), certain control parameters are either permanently implemented or adjustable, with which specific properties of the welding seam can be influenced. Such control parameters can include, for example, a feed rate of the additive material in the direction of the components to be bonded, a seam production speed of the welding unit relative to the components, temperatures, pressures, electrical voltages and currents, etc. In the case of arc welding methods such as, for example, MIG/MAG welding, various welding processes can generally be used that have different welding parameters as control parameters. These include, for example, a welding current, a welding voltage, a welding wire feed rate, a pulse frequency of the welding current (during the pulse welding process), a phase shift of the welding currents of a plurality of welding torches (during the multiple welding process), etc.

The selection of welding parameters can, for example, influence a geometry of the welding seam, for example a welding scale width, a welding scale thickness or a welding scale length of the welding scales from which the welding seam is made. The selection of welding parameters or generally control parameters can influence certain welding seam properties of the welding seam, for example the strength of the welding seam. This means that, depending for example on the geometry, material of the components and the boundary conditions to be expected in the planned field of application (e.g. mechanical and/or thermal stress, safety risk for people, service life, etc.), different control parameters can be used in order to produce a welding seam having the desired properties.

In particular in the case of safety-relevant welding seams, such as, for example, when welding ship hulls, load-bearing components of machines or structures, etc., a recurring check of the welding seam is often necessary or is even prescribed for legal reasons. In this case, non-destructive test methods are often used, such as visual inspection or ultrasound testing. Depending on the care taken to record data during and after the process of producing the welding seam, the person performing the check generally has no, or only inadequate, information about the welding seam. In particular, the control parameters used in the process of producing a welding seam, which control parameters can represent an important source of information for assessing the quality of a welding seam, are generally no longer available or only available to a limited extent during the check. If anything, such information is usually available in hard copy form or in stored form on a computer when the welding seam is produced, but not when the welding seam is checked. Providing such data during the process of checking the welding seam is therefore usually time-consuming or not possible at all or only to a limited extent.

US 2014/326507 A1 discloses a method for introducing an identification code on an outer surface of a drill for crude oil production. The code is introduced in the form of a build-up welding seam with point-dash combinations on the peripheral surface of the drill such that it can be detected using suitable sensors.

The object of the invention is therefore to provide a welding method that allows simple and long-term availability of information on the welding method being carried out to produce a welding seam.

The object is achieved according to the invention in that an information is included in the at least one control parameter, said information during the process of producing the welding seam being stored in the welding seam between an information start point and an information end point in the seam course using the at least one detectable external physical welding seam property so that the information can be read, preferably optically and/or haptically, from a sequence of the at least one detectable external physical welding seam property along the seam course in the region between the information start point and the information end point. In this way, specific desired information can be permanently stored in the welding seam so that the information can be read directly from the welding seam at any later time after the welding seam is produced. As a result, information can easily be prevented from being lost, for example because it was not sufficiently documented when performing the welding method. In the context of the invention, the term "included" is substantially understood to mean that the information to be stored is incorporated or integrated into the control parameters such that the information in the welding seam produced is reflected in the form of a sequence. In the context of the invention, the term "store" is substantially understood to mean irreversible embedding or imprinting of the information in the welding seam produced. In the context of the invention, the term "sequence" is substantially understood to mean a characteristic sequence of successive detectable external physical welding seam properties along the seam course of the seam from which the stored information can be obtained unambiguously and reproducibly.

Preferably, during the process of producing the welding seam, the at least one control parameter is varied in order to change the at least one detectable external physical welding seam property in the seam course between the information start point and the information end point, wherein different forms of the at least one external physical welding seam property are assigned to code letters of a code alphabet and the information is stored as a combination of the code letters of the code alphabet. This creates a simple possibility for storage.

In an advantageous manner, the information is stored in the form of a machine-readable digital code so that the information can be read by means of a readout unit from the sequence of the at least one detectable external physical welding seam property, preferably by means of a contactless scanner, at least one camera or a measuring probe, wherein a multi-value code, particularly preferably a binary code or a ternary code, is preferably used as the digital code. As a result, the Information can be read manually or automatically in a simple manner.

According to an advantageous embodiment, a measurable geometric parameter of the welding seam is used as the at least one detectable external physical welding seam property, preferably a welding seam thickness, a welding seam width, or a welding seam length of sections of the welding seam, in particular a welding scale length of welding scales or a length of a region of the welding seam without additive material. As a result, easily measurable variables can be used which facilitates reading of the information.

The information preferably contains method data on the control parameters used for the welding method, which control parameters are used to produce the welding seam, or reference information assigned to the method data. However, the information can also contain external data independent of the welding method or reference information assigned to the external data. This allows information to be stored that directly relates to the welding process that was used to produce the welding seam. Alternatively or additionally, other interesting data can also be stored that does not directly relate to the welding process but still represents an important source of information, for example data relating to components, the date and time of production of the welding seam, etc. By storing reference information, a smaller amount of data can be stored in the welding seam, and the actual interesting information can be retrieved via the assigned reference information, for example from an external data source.

It can be advantageous if the method data includes data on welding parameters used, which data is used to produce the welding seam, preferably data on a welding current and/or a welding voltage and/or a feed rate of the additive material and/or a pulse frequency of a welding current and/or a number of welding cycles and/or a duration of welding cycles. As a result, the specifically used welding parameters can be stored in a simple manner and later read from the welding seam, for example in the context of a quality check.

It is advantageous if the information is stored in the control unit and/or is transmitted to the control unit before the welding method is carried out and/or is transmitted by means of an input unit to the control unit and/or is converted to a digital code by the control unit. As a result of the storage, the information can be used again, or it is possible at a later point to trace, for example, when information was stored and which information was stored. By means of an input unit, for example, information to be stored could be input manually. If the information is present, for example, on an external unit, it can be transmitted to the control unit in a simple manner. The conversion may be advantageous for converting information to a particular digital code in which it is stored in the welding seam.

The welding method used is preferably an arc welding method with a consumable or non-consumable electrode, a laser welding method or an electron beam welding method. Known welding methods can thus be used.

Preferably, a marking welding seam can also be produced on at least one of the components by build-up welding, wherein information is included in the at least one control parameter, said information during the process of producing the marking welding seam being stored in the marking welding seam between an information start point and an information end point in the seam course of the marking welding seam using the at least one detectable external physical welding seam property so that the information can be read, preferably optically and/or haptically, from a sequence of the at least one detectable external physical welding seam property along the seam course in the region between the information start point and the information end point. As a result, in addition to the connecting welding seam, a marking welding seam can be produced on the surface of a component that only serves to store the information and not to connect the components.

It can also be advantageous if a marking seam section not used for the materially cohesively bonding is provided in the welding seam, wherein information is included in the at least one control parameter, said information during the process of producing the marking seam section of the welding seam being stored in the welding seam between an information start point and an information end point in the seam course of the marking seam section using the at least one detectable external physical welding seam property so that the information can be read, preferably optically and/or haptically, from a sequence of the at least one detectable external physical welding seam property along the seam course of the seam in the region between the information start point and the information end point. As a result, sections can be integrated in the connecting welding seam, which sections only serve to store the information and not for bonding the components.

Figure 2:
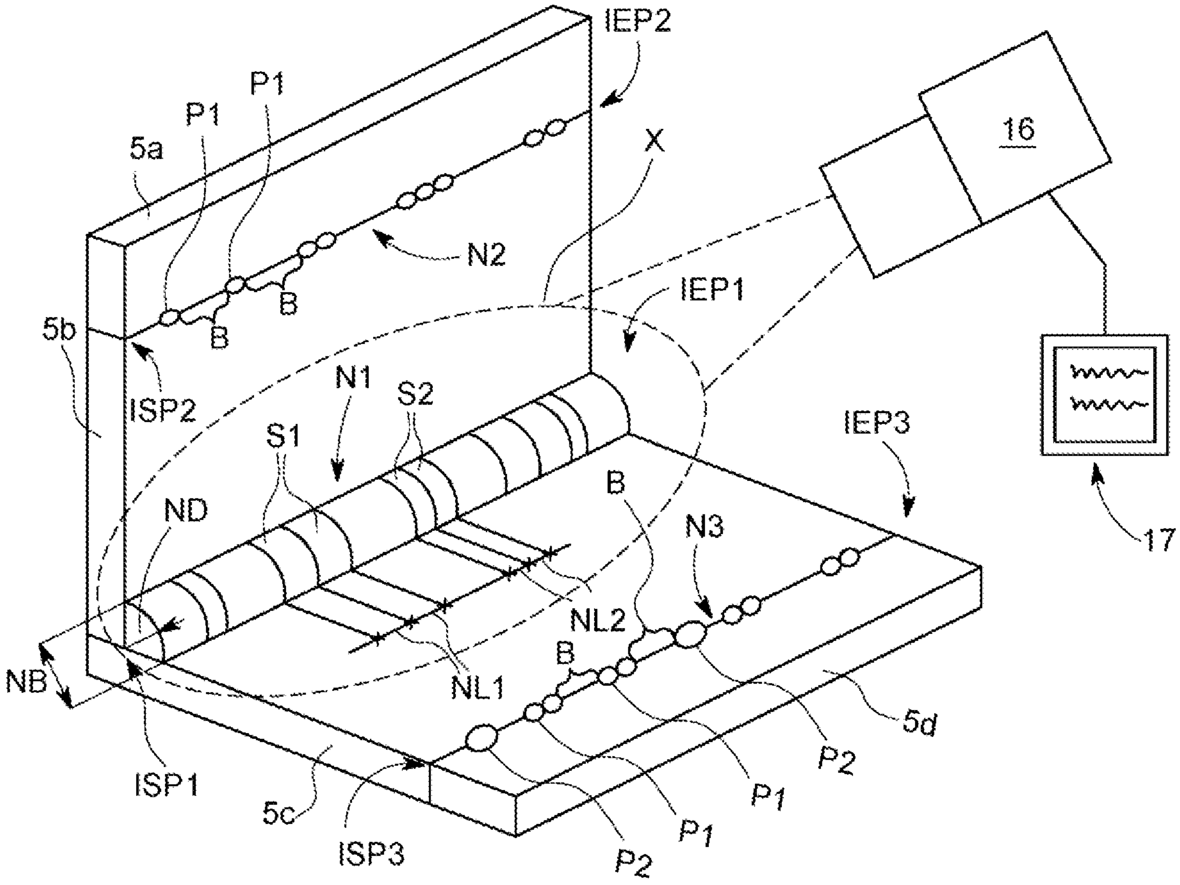

In the following, the present invention is described in greater detail with reference to FIGS. 1 to 2, which, by way of example, show advantageous embodiments of the invention in a schematic and non-limiting manner. In the drawings, FIG. 1 shows a device for carrying out a welding method in the form of a welding device;

FIG. 2 shows a plurality of components respectively bonded by a welding seam and a readout unit for reading digital information from the welding seam.

FIG. 1 shows a device 1 for carrying out the welding method according to the invention. The device 1 is provided to bond at least two components 5 to one another in a material cohesive fashion by means of at least one additive material Z. The device 1 has at least one welding unit 2 for generating a welding seam N consisting of the additive material Z, a manipulation unit 3 for moving a welding torch 6 of the welding unit 2 along a predetermined seam course, and a control unit 4 for controlling the device 1. A suitable metallic filler material is generally used as an additive material Z. The filler material can either be supplied to the welding point integrally using the welding torch 6, such as, for example, in the known MIG welding method, but could also be supplied separately to the welding point, for example with a separate feed unit, such as in the known TIG welding method. The feed unit is then naturally moved synchronously with the welding torch 6 by the manipulation unit 3. The seam course of the welding seam N results substantially from the geometry of the components 5 to be bonded and can range from a simple straight line to complex three-dimensional seam courses.

In the example shown, two simple plate-shaped components 5 are shown, which are arranged at an angle of approximately 90 degrees to one another and are materially cohesively bonded with a welding seam N in the form of a known fillet weld. This results in a seam course in the form of a straight line, in this case in the direction perpendicular to the drawing plane. Of course, this is only to be understood as an example. If, for example, a cylindrical component and a component having a planar surface are bonded, the seam course of the seam can, for example, have a circular profile. In this case, the welding seam N does not necessarily have to run continuously, i.e., without interruption, but instead an intermittent welding seam N would also be possible in principle, in which no additive material Z is applied in sections along the seam course of the seam. An intermittent welding seam N can be produced, for example, by what is known as interval welding, as will be described in more detail with reference to FIG. 2. In the context of the invention, a welding seam N is therefore not necessarily to be understood as a continuous seam, but also an interrupted or partially interrupted seam.

The components 5 are preferably positioned and fixed relative to one another in the desired position before the start of the welding process. This can take place, for example, using a suitable clamping device or other suitable positioning device. In the example shown, the components 5 are arranged on a frame 11 and fixed by means of clamping elements 12*a*, 12*b* of a clamping device. However, this is of course only exemplary and any other type of relative positioning would also be possible.

To produce the welding seam N, the welding torch 6 is moved by the manipulation unit 3. Depending on the planned seam course of the welding seam N, a suitable manipulation unit 3 can be used, with which the welding torch 6 (and optionally the feed unit) can be moved with the required degrees of freedom of movement. A translational degree of freedom of movement would be sufficient in principle for the welding seam N of the illustrated example with a straight seam course. In order to be able to realize various and in particular also more complex multi-dimensional seam courses, it is advantageous, however, if the manipulation unit 3 has more than just one translational degree of freedom of movement. FIG. 1 shows schematically and merely by way of example a known multi-axis industrial robot 3*a* that is arranged on a frame 13. Of course, any other suitable manipulation units 3 would also be possible. A drive unit 14 for driving the manipulation unit 3 is also provided in the frame 13, said drive unit being controllable by the control unit 4 in order to carry out a desired movement sequence.

The control unit 4 (for example designed as hardware and/or software) is in this case likewise integrated by way of example in the frame 13, but could of course also be arranged at any other location. Both the manipulation unit 3 and the welding unit 2 can be controlled via the control unit 4. Of course, a plurality of control units could also be provided in the device 1, which control units communicate with one another, for example (at least) a separate control unit for the manipulation unit 3 and (at least) a separate control unit for the welding unit 2. The control unit 4 and/or the separate control units could then be connected, for example, to a superordinate control unit 15, as indicated in dashed lines in FIG. 1. As a result, for example, a plurality of devices 1 according to the invention and/or other systems could also be controlled centrally and synchronized with one another. This can be advantageous, for example, in more complex production processes, in which, for example, a plurality of devices are simultaneously used on a workpiece, such as, for example, when welding vehicle bodies or the like. Such superordinate control units are sufficiently known from the prior art and therefore will not be addressed in more detail at this point.

Changing at least one control parameter of the control unit 4 of the device 1 can influence at least one detectable external physical welding seam property of the welding seam N. Within the scope of the invention, a detectable external physical welding seam property is understood to mean a property of the welding seam N relating to the external physical nature of the welding seam N, i.e., a property that can be recognized or detected from the outside. This can be, for example, a qualitative feature of the welding seam N that can be recognized optically or haptically, such as, for example, the presence (or absence) of the additive material Z in sections along the seam course of the seam of the welding seam N. In the case of an intermittent welding seam (e.g. welding seam N2 in FIG. 2), for example a welding spot P1 and/or a region B between the welding spots P1 could be a detectable external physical welding seam property, as is shown in FIG. 2 with reference to the second and third welding seams N2, N3.

However, a detectable external physical welding seam property can also be, for example, a quantitative measurable geometric parameter of the welding seam N, such as a welding seam thickness ND, welding seam width NB or a welding seam length NL of specific sections of the welding seam N. In the case of an uninterrupted welding seam N, the section of the welding seam N can be, for example, a welding scale Si that forms the welding seam N. The welding seam length NL can in this case be a welding scale length NLi of the welding scales Si, as shown in FIG. 2 with reference to the first welding seam N1. In the case of an interrupted welding seam N, the section can be, for example, a welding spot Pi, and the welding seam length NL could be a welding spot length of the welding spots Pi. A length of a region B without additive material Z could also be used, for example, as a measurable geometric parameter. Of course, one or more specific detectable external physical welding seam properties could also be influenced by a plurality of control parameters.

A control parameter of the control unit 4 can be, for example, a movement speed of the manipulation unit 3 with which the welding torch 6 is moved relative to the components 5. However, a control parameter can also be a welding parameter of the welding unit 2. A control parameter can, of course, also be understood in each case as an equivalent variable. Usually, a plurality of welding parameters can be set on a welding unit 2, which welding parameters are used for a specific welding process, such as, for example, a feed rate of the additive material Z (in the direction of the components 5 to be bonded), a welding current, a welding voltage, a pulse frequency of the welding current, etc. For example, control programs having defined or definable control parameters can be stored in the control unit 4, which control programs can be selected by a user of the device 1 in order to produce a welding seam N having one or more specific detectable external physical welding seam properties. For example, a desired seam start and a desired seam end as well as an intermediate desired seam course of the welding seam N to be produced can also be predetermined. The control unit 4 controls the welding torch 6 and the manipulation unit 3 correspondingly with the predetermined settings with specific control parameters in order to produce the welding seam N in an automated manner.

According to the invention, information can be included in at least one control parameter of the control unit 4, said information being processed by the control unit 4 and taken into consideration by the control unit 4 in the control device 1, in particular in the control of the welding torch 6 and/or the manipulation unit 3, The control unit 4 processes and takes into consideration the information such that the information is stored in the welding seam N during the process of producing the welding seam N between a specific information start point ISP and a specific information end point IEP in the seam course by means of at least one external physical welding seam property. The information can be, for example, numerical information in the form of numerical values, such as a value of a welding parameter, such as for example of the welding current or the welding voltage; a welding program number as reference information for a specific welding program; a welding process number assigned to specific welding process; or other relevant setting values and reference values, such as, for example, checksums, numerical signatures, etc. However, the information can also be, for example, alphabetical information (in the form of letters or whole words, e.g. component number, etc.) or alphanumeric information (a mixture of numerical values and letters, e.g. a specific serial number or a product code, etc.). The information can be stored in the welding seam N in such a way that it can be read from a sequence of the at least one detectable external physical welding seam property along the seam course of the seam in the region between the information start point ISP and the information end point IEP. The storage preferably takes place in such a way that the reading can take place optically and/or haptically.

For example, the at least one control parameter can be varied during the process of producing the welding seam N in order to change the at least one detectable external physical welding seam property in the seam course of the seam between the information start point ISP and the information end point IEP. In this case, different forms of this one external physical welding seam property can be assigned code letters of a code alphabet, and the information is stored in the welding seam N as a combination of the code letters of the code alphabet. Each code has a defined code alphabet having a certain number of code letters or code symbols. Each letter (e.g. A, B, C, etc.) and each number (e.g. 1, 2, 3, etc.) of the information to be stored and consequently each information word to be stored (e.g. CURRENT) or each information number to be stored (e.g. 123) is formed by a combination of letters of the code alphabet.

For example, a geometric parameter such as, for example, the welding scale length NLi of the welding scales can be used as a detectable external physical welding seam property. The different characteristics of the external physical welding seam property would be different welding scale lengths NLi of welding scales Si (see FIG. 2). The welding scale lengths NLi of the welding scales Si can be influenced by the variation of one (or more) control parameters in the control unit 4. The welding unit 2 can also have, for example, a separate welding control unit (not shown) for controlling the welding process, which welding control unit is controlled by the control unit 4 (or the superordinate control unit 15). To introduce the information into the welding seam N, it may be sufficient, for example, if the information to be stored is included exclusively in the control parameters of the welding control unit. For example, one or more control parameters of the welding control unit could be varied to produce, for example, welding scales Si (as an external physical seam property) having a different welding scale length. NLi (as different characteristics of the external physical welding seam property).

Each welding scale length NLi is assigned a particular code letter of a particular code alphabet. Consequently, the desired information can thus be stored in the welding seam N by producing a specific sequence of welding scales Si along the seam course of the seam, which welding scales correspond to the information and each have a specific welding scale length NLi (having an assigned code letter). In an advantageous embodiment of the invention, the information is stored in the form of a machine-readable digital code so that the information can be read from the sequence of the at least one detectable external physical welding seam property along the course of the seam using a readout unit 16 (FIG. 2). For example, a contactless scanner or a measuring sensor can be used as the readout unit, as will be explained in more detail with reference to FIG. 2. Any suitable type of digital code, preferably a multi-value code, can be used as a digital form of storage.

Known multi-value codes include, for example, the binary code, the code alphabet of which contains two different code letters or code symbols (usually 0/1 or true/false). The information can consequently be stored as a sequence of the two code letters, wherein each code letter is again stored in the form of a specific detectable external physical welding seam property in the welding seam N. Another known multi-value code is the ternary code, the code alphabet of which consists of three different code letters or code symbols (usually 0/1/2 or −1/0/1). The information can consequently be stored as a sequence of the three code letters, wherein each code letter is again stored in the form of a specific detectable external physical welding seam property in the welding seam N.

In addition, there are also further known digital codes, which could of course also be used, for example, multi-value codes having more than three code letters, such as, for example, quaternary (four code letters), quinary (five code letters), decimal (ten code letters), hexadecimal (sixteen code letters), etc. The information could then be stored in the welding seam N, for example, in a binary, ternary or other multi-value code according to the ASCII code. A proprietary information protocol, similar to a bus protocol, would also be possible, for example. The information could thus be stored, for example, with a non-published manufacturer-specific standard and thus, for example, only be read out by authorized persons.

As already described, one or more measurable geometric parameters of the welding seam N can also be used as the detectable external physical welding seam property, such as a welding seam thickness ND, and/or a welding seam width NB and/or a welding seam length NL of sections of the welding seam N along the seam course of the seam and/or a length of a region B of the welding seam N without additive material Z, for example in the case of a welding seam N produced by interval welding (FIG. 2). In the case of an uninterrupted welding seam N, a welding scale length NLi of welding scales Si can be used, for example, as is illustrated by means of the first welding seam N1 in FIG. 2. These external physical welding seam properties are consequently generated in accordance with the digital code used by varying the control parameter(s) in the welding seam N such that a code sequence corresponding to the information to be stored is stored between the information start point ISP and the information end point IEP in the seam course of the welding seam N. In the case of a binary code, this could be done, for example, by using two different geometric parameters, each corresponding to a code letter, as will be explained in more detail below with reference to FIG. 2.

If a plurality of different measurable geometric parameters are used to store the information in the welding seam N, a code letter of a multi-value code can be assigned to each of the geometric parameters, for example. A combination of two or more measurable geometric parameters could also be used, for example, as a code letter of the code. In the case of a binary code, two different measurable geometric parameters can be used for example, and a code letter is assigned to each geometric parameter. In the case of a ternary code, three different measurable geometric parameters can be used, wherein each geometric parameter is assigned a code letter, etc. In a ternary code, this could mean, for example, that a certain welding seam thickness ND of sections of the welding seam N (e.g. of welding scales) is assigned to a first code letter, a certain welding seam width NB is assigned to a second code letter and a welding seam length NL is assigned to the third code letter of the ternary code.

If only two measurable geometric parameters (e.g. welding seam width NB and welding seam length NL of sections of the welding seam N) are used for the ternary code, a certain welding seam width NB could also be assigned to a first code letter, a certain welding seam length NL could be assigned to a second code letter, and a certain combination of a certain welding seam width NB and a certain welding seam length NL could be assigned to the respective third code letter of the ternary code. Of course, only one measurable geometric parameter could also be used, and certain different characteristics of the geometric parameter could in each case be assigned to a code letter. For example, only the welding seam thickness ND of sections of the welding seam N could be used as measurable geometric parameters, and different defined values of the welding seam thickness ND could in each case be assigned to a code letter. It can be seen from this that there is a plurality of variants for storing the information in the welding seam N, from which a person skilled in the art can select a suitable variant.

The method can advantageously be used to store method data in the welding seam N about the control parameters used to produce the welding seam N. For example, the welding parameters used to produce the welding seam N could be stored in the welding seam. In this way, for example, the information stored in the welding seam N could be read out in a simple manner during a later welding seam check (which may take place several months after the production of the welding seam). This makes it possible to understand which welding parameters were used during the welding process without any other type of documentation being required. The person to perform the test merely needs to read the stored information from the welding seam optically, haptically or preferably by means of a suitable readout unit 16. Of course, the same (or other) information can also be stored at a plurality of points of a welding seam N, for example in regions of the welding seam N that are spaced apart from one another along the seam course of the seam. This can be advantageous, for example, in the case of relatively long welding seams N in order to be able to read the information at different points or to assign information to certain sections of a welding seam.

However, the method data itself need not necessarily be stored in the welding seam N, but reference information that is uniquely assigned to the method data could also be stored, for example in the form of a reference number unambiguously assigned to the method data. The method data can then be determined from the read reference information, for example from another data source. Due, for example, to the relatively large amount of data to be expected when introducing the welding parameters, this can be advantageous because the method data on the welding parameters does not have to be stored directly in the welding seam N, but merely the reference information. Using the reference information, the welding parameters used can then be read, for example, from a data source, such as a database. However, the data source could also be integrated, for example, in the device 1, for example in the storage unit of the welding unit 2. The method data assigned to the reference information could then be read from the read-out reference information, for example, via a user interface of the device 1 (or of the welding unit 2), for example via a touchscreen.

For example, it would be conceivable for a link to the data source to be established automatically during the readout of the stored information by means of a suitable readout unit 16. The data source can be integrated in the readout unit 16, for example, or the readout unit 16 could also access an external data source via a suitable data connection. As a result, only a relatively small amount of data (of the reference information) must be stored in the welding seam N, and the larger data volume (of the method data) can be stored in a different data source. For example, the reference information could be read by means of a smartphone via the integrated camera.

A suitable smartphone app on the smartphone could automatically display the method data assigned to the respective reference information when specific reference information is identified. The method data can, for example, be stored directly on the smartphone, which is advantageous, for example, in the case of an autonomous application in which the smartphone has no communication connection or only an insufficient communication connection. However, the method data (assigned to the reference information) could also be retrieved automatically via an external data source, for example via a wireless communication link of the smartphone. Forwarding to a website on which the method data assigned to the reference information can be read is also possible. The production of the reference information, for example the calculation of a reference number, could take place, for example, in the control unit 4, a superordinate control unit 15 or a different control unit of the device 1, for example the welding control unit of the welding unit 2. However, the reference information could also be produced in an external third-party system, for example, and transmitted to the device 1 in a suitable manner. The third-party system can be, for example, a documentation or analysis system.

Alternatively, or additionally, external data independent of the welding method could also be stored in a welding seam N. This could, for example, include metadata on the welding method carried out or on the welding seam N, such as the type of additive material Z used; the date, time or duration of performance of the welding method; information on the person who performed the welding method; information about the components 5; other production-related information, etc. However, other data could also be stored that is not directly related to the welding seam N, for example information about a customer, information from an operating manual or from another document.

Similar to the method data, it is of course also possible to store only reference information in the welding seam N in the case of external data. The external data assigned to the reference information could, for example, again be taken from an external data source. For example, instead of directly storing the information from the operating manual in the welding seam N, reference information could be stored as a type of link to the respective location of the operating manual. Via a suitable readout unit 16, a person could be guided directly to the corresponding place in the operating manual by reading the reference information, in this case, the operating manual could again be stored locally, for example, directly in the readout unit 16 or in an external data source that can be accessed by means of the readout unit 16, for example via a suitable wireless communication link.

The information to be stored can be stored, for example, in a suitable storage unit integrated in the control unit 4 or in a separate storage unit in order to be able to be used by the control unit 4. The information can, for example, also remain stored in the storage unit after the welding method has been carried out, for example in the form of a log file, so that the information can also be retrieved later or can be reused for producing a further welding seam N. For example, a user interface could also be provided in the device 1, for example in the form of a touchscreen, by means of which the information stored in the storage unit can be selected, which information is then used to be stored in one or more further welding seams N.

In particular, if the information that is to be stored in the welding seam N contains external data, it is advantageous if the data is transmitted to the control unit 4 before the welding method is carried out. This can take place, for example, via a suitable data transmission interface on the device 1, for example directly on the control unit 4 or via a possible superordinate control unit 15. Any suitable interface can be used as the data transmission interface, for example a wired interface such as Ethernet or a wireless interface such as WLAN, Bluetooth or NEC. It can also be advantageous if an input unit is provided in the device, via which input unit the information can be input to the control unit 4. For example, a user interface, such as a touchscreen, a keyboard, etc., could be provided in order to enter the information. The information to be stored could be entered, for example, in the form of numerical values, text, etc. via the user interface. The position along the seam course of the seam on which the information is to be stored in the welding seam N could also be input via the user interface, for example. It would be conceivable, for example, for the information start point ISP and the information end point IEP to be defined as points in time in the welding process. The information start point ISP could also be defined as the time and a certain time period could be specified during which the information is introduced into the welding seam N. The information end point IEP then results automatically.

As a rule, the information is not present in the form in which it is stored in the welding seam N, such as in a binary, ternary or other multi-value format. It is therefore advantageous if the information to be stored is converted by the control unit 4 into the form in which it is stored in the welding seam N. For this purpose, for example, a suitable conversion unit can be provided in the device 1, for example integrated in the control unit 4, or also as a separate unit that communicates with the control unit 4. As a result, for example, desired information can be converted (e.g., numerically, alphabetically, or alphanumerically) by the conversion unit into the digital code in which the information is finally stored in the welding seam N by one or more detectable external physical welding seam properties. The desired Information could be input, for example, via a user interface (e.g. a keyboard or touchscreen), for example in ASCII format, and can be converted, for example, into the binary or ternary code, by the conversion unit. In the course of the conversion (or even earlier), compression, encryption, calculation of a checksum or signature, etc. can also take place, for example. However, the information to be stored in the welding seam N could also be selected, for example, from information already stored in the control unit 4 or the storage unit integrated therein. For example, certain recurring component numbers, users, method data such as welding parameters, reference information assigned to certain welding processes, etc. could be selected quickly and easily.

In the example shown in FIG. 1, the welding unit 2 is designed to carry out an arc welding method with a consumable electrode, in this case, the additive material Z simultaneously also serves as an electrode that is fed to a welding point in the form of a welding wire. As is known, the welding wire is melted by an electric arc burning between the (at least partially metallic) components 5 to be materially cohesively bonded and the welding wire in order to produce the welding seam N. Often, an inert or active protective gas is also used, which is supplied to the welding point in order to shield the welding point from the environment in order to avoid oxidation. This is also referred to as metal active gas welding (MAG), metal inert gas welding (MIG) or generally metal shielding gas welding (MSG). Because the welding methods and the basic construction of a welding unit 2 for carrying out the welding methods are basically known, this is not discussed in detail at this point.

As is known, the welding unit 2 can have a welding torch 6 to which the additive material Z in the form of a welding wire is fed by a suitable welding wire feed unit 8 via a hose pack 10. If a protective gas is used, the protective gas can, for example, likewise be fed to the welding torch 6 from a suitable protective gas container 9 via the hose pack 10. The welding unit 2 also has a welding current source 7 that provides the required energy for the welding method in the form of an electrical welding current or an electrical welding voltage. To generate the arc, a welding current circuit is closed over the components 5 to be welded. For this purpose, for example, the welding torch 6 can be connected to the welding current source 7 via a first electrical welding line L, for example again via the hose pack 10, and the workpiece (the components 5 to be welded) can be connected to the welding current source 7 by means of a second welding line, for example a ground line M.

The control unit 4 can be used to control the welding method by setting or adjusting certain welding parameters of a specific welding process that is carried out using the welding unit 2. Known welding processes of a MIG welding method include, for example, a pulse welding process, a short arc welding process, a special form of the short arc welding process such as the CMT welding process, etc. The welding parameters include, for example, an electrical welding current, an electrical welding voltage, a wire feed rate of the welding wire (or generally of the additive material Z), a pulse frequency of the welding current, a number of welding cycles and/or duration of welding cycles, etc. Because the welding processes and the welding parameters thereof are known, a more detailed description is unnecessary at this point.

However, a known multiple welding method could also be used, for example, in which a plurality of welding wires are fed to the welding point (via one or more welding torches). A separate welding process is carried out at each welding wire, wherein the welding wires are each melted with an arc. In this case, it is also possible, for example, to use different additive materials Z; the welding seam N can then consist of the different additive materials Z. In the case of a multiple welding method, a temporal phase shift between the welding current (and/or the welding voltage) of the two separate welding processes can also be used as a welding parameter, for example. Of course, this is to be understood only as an example, and any other welding method could also be used by means of which an integral welding seam N consisting of an additive material Z can be produced. Known suitable welding methods include, for example, a laser welding method or an electron beam welding method. Combined welding methods are also known, for example laser hybrid welding, in which an MIG welding method and a laser welding method are combined.

The information to be introduced into the welding seam N could contain, for example, method data about the welding parameters used to produce the welding seam N. For example, information can thus be stored in the welding seam N about how high the welding current and/or the welding voltage used to produce the welding seam N were. The height of the feed rate of the filler material and/or a pulse frequency of the welding current could also be stored, for example. The method data of the manipulation unit 3 can of course also be stored in the welding seam, for example a welding speed at which the welding unit 2 has been moved relative to the components 5. As a result, it is possible to ascertain at a later point in time with which settings of the device 1 the welding unit was produced.

FIG. 2 shows a plurality of components 5*a*-5*d* that were connected by the welding method according to the invention by means of welding seams N1-N3, The welding seams N1-N3 may have been produced, for example, with the device according to FIG. 1. For the sake of simplicity, the welding seams N1-N3 each have a straight seam course, but of course more complex, multi-dimensional seam courses would also be possible. This depends substantially on the geometry of the components 5 to be connected. In the welding seams N1-N3, information is stored in a digital form using detectable external physical welding seam properties. The first welding seam N1 is formed as a continuous, i.e., uninterrupted, welding seam N and can be produced, for example, using a pulse welding process or other suitable welding process of an arc welding method or also using a different welding method. The first welding seam N1 bonds the components 5*b* and 5*c* to one another in a material cohesive fashion.

The welding seams N2+N3 are produced by what is known as interval welding. The second welding seam N2 bonds the components 5*a* and 5*b* to one another, and the third welding seam N3 bonds the components 5*c* and 5*d* to one another in a material cohesive fashion. In interval welding, a continuous welding seam is generally not produced, but rather an intermittent, i.e., interrupted welding seam N is produced. During interval welding, the welding seam N therefore often consists of successive welding spots Pi from the additive material Z, which welding spots are separated from one another in the direction of the seam course of the seam by a region B without additive material. However, it would also be possible in principle to produce a continuous welding seam N during interval welding. At this point it should be again pointed out that a welding seam N within the scope of the invention is not necessarily to be understood to mean a continuous welding seam N, but that intermittent welding seams are also to be understood as welding seams N within the meaning of the invention.

In the first welding seam N1, a welding seam length NLi of sections of the welding seam N1 serves as a detectable external physical welding seam property with which the information in the welding seam N1 is stored. The welding seam length NLi is generally understood to mean a length of distinguishable sections of a welding seam N in the direction of the seam course of the seam. In this specific case, the welding seam N1 shown has successive welding scales Si that result from the process control of the welding process used. The shape of the welding scales Si and, in particular, the welding scale length NU of the welding scales Si can be influenced by one or more control parameters of the welding method, in particular by the welding speed at which the welding torch 6 is moved by the manipulation unit 3 relative to the components 5*b*, 5*c*, by the feed rate of the additive material Z and in particular also by welding parameters such as, for example, the welding current, the pulse frequency (in the case of a cyclically pulsating welding current), the number of welding cycles and/or the duration of the welding cycles, etc. However, it is already known in principle how the welding scale length NLi can be influenced, which is why this is not discussed in detail here.

The welding scale length NLi can consequently be used to store the desired information in a digital form in the first welding seam N1. Depending on which digital code is used, different welding scale lengths NLi can be assigned to the code letters of the code alphabet of the code. In the case of a binary code, for example, two different welding scale lengths NL1, NL2 can be used, which are introduced into the welding seam N1 in a specific sequence along the seam course of the seam in accordance with the information content, as is indicated in FIG. 2. A welding scale length NL1, NL2 can be interpreted, for example, as the "logical zero" code letter or code symbol of the binary code, and the respective other welding scale length NL1, NL2 can be interpreted as the "logical one" code letter or code symbol of the binary code. The information is stored between a defined information start point ISP1 and a defined information end point IEP1 in the welding seam N1. In the example shown, the information start point ISP1 corresponds to the seam start of the welding seam N1, and the information end point IEP1 corresponds to the seam end of the welding seam N1. Of course, this is only an example and the information start point ISP1 and the information end point IEP1 could also be located at a different location of the welding seam N1, for example in a specified central section of the welding seam N1. Of course, repeated introduction of the same (or other) information at different points of the welding seam N1 along the seam course of the seam would also be conceivable.

Of course, as mentioned, a plurality of different detectable external physical welding seam properties could also be used to store the information. For example, in the case of the illustrated first welding seam N1, a first code letter of the binary code could be assigned to a certain welding scale length NLi of the welding scales Si, and the respective second code letter of the binary code could be assigned to a certain welding scale width NBi of the welding scales Si. The information then arises from a sequence of welding scale length NLi and welding scale width NBi along the seam course of the seam. In the case of higher-value codes (e.g. ternary, quaternary, quintary, etc.), the further code letters can each be assigned in accordance with a further detectable external physical welding seam property. For example, a certain welding seam thickness NDi of the welding scales Si could additionally be used as a third code letter of a ternary code. Various forms of a detectable external physical welding seam property such as, for example, different values of the welding seam thickness NDi can of course also be assigned to each code letter.

The second welding seam. N2 is a welding seam produced by interval welding, which welding seam has a plurality of welding spots P1 of a certain size consisting of the additive material Z, which welding spots are each separated from one another by a region B without additive material Z. The information is in turn stored between a defined information start point ISP2 and a defined information end point IEP2 in the welding seam N2. The information is stored here in the binary code in the welding seam N2. In this case, the welding spots P1 and the regions B therebetween serve as detectable external physical welding seam properties for storing the information. The welding spots P1 preferably have the same size (at least in the region between the information start point ISP2 and the information end point IEP2). The welding spots P1 can be interpreted as “logical zero” of the binary code can and the regions B between the welding spots P1 as “logical one” (or vice versa). The stored information consequently results from the sequence of the welding spots P1 and the regions B along the seam course of the seam between the information start point ISP2 and the information end point IEP2.

The third welding seam N3 is a welding seam N also produced by interval welding. In contrast to the second welding seam N2, the third welding seam N3 has welding spots P1, P2 of different sizes, which are each separated from one another by a region B without additive material Z. The information is in turn stored between a defined information start point ISP3 and a defined information end point IEP3 in the welding seam N3. The information is stored in a ternary digital format here. The first welding spots P1 of a defined first size, the second welding spots P2 of a defined second size and the regions B therebetween serve as detectable external physical welding seam properties for storing information. For example, a second welding spot P2 can in each case be interpreted as the “logical two” (or “logical −1”) code letter or code symbol of the ternary code, a first welding spot P1 can in each case be interpreted as the “logical one” code letter or code symbol, and the regions B between the welding spots P1, P2 can in each case be interpreted as the “logical zero” code letter or code symbol. Of course, a different assignment would also be possible. The stored information consequently results from the sequence of the welding spots P1, P2 and the regions B therebetween along the seam course of the seam between the information start point ISP3 and the information end point IEP3.

Of course, the illustrated embodiments are to be understood as examples only, and any other suitable detectable external physical welding seam properties could also be used to store the information. For example, measurable geometric parameters of a welding seam N could be used, such as a welding seam thickness ND, a welding seam width NB of sections of the welding seam N. In the event that the information start point ISP does not correspond to the start of a welding seam N, and the information end point IEP does not correspond to the end of a welding seam N, it can be advantageous if the information start point ISP and the information end point IEP are marked in a suitable manner, such that a person can recognize without great effort the region of the welding seam in which the information is stored. In the first welding seam N1 shown, this could be achieved, for example, in that, outside the region in which the information is stored, i.e., along the seam course of the seam before the information start point ISP and after the information end point IEP, a regular arrangement of the welding scales Si of same welding scale length NLi is provided. As a result, the region without information and the region in which the information is stored are optically distinguished, such that the information start point ISP and the information end point IEP can be identified.

As mentioned at the outset, in the simplest case, the information could also be read in principle by visual inspection or by touch. However, this requires knowledge of the code in which the information is stored, which under certain circumstances is not always the case and is also very time-consuming and complex. It is therefore advantageous if the information is stored in machine-readable form so that it can be read using a suitable readout unit 16 in order to be displayed preferably on a suitable display unit 17. The readout unit 16 can be used to scan a welding seam N between the respective information start point ISP and the information end point IEP, which can take place either manually or automatically. The readout unit 16 recognizes the stored information on the basis of the detectable external physical welding seam properties and can transmit the information, for example, to a suitable display unit 17 on which the information is displayed and can be read by a person. It would be conceivable, for example, to use a hand scanner in the manner of a barcode scanner, a tactile measuring sensor known from manufacturing technology or a camera.

In the example shown, the readout unit 16 is designed as a camera and the welding seam N3 (or at least the region between the information start point ISP and the information end point IEP) is located in the recording region X of the camera, as indicated by dashed lines in FIG. 2. Via suitable image recognition software, which can be integrated, for example, directly in the camera or the evaluation unit 17, the stored information can be obtained from the recorded image of the welding seam N. For example, a portable computer having an integrated camera, such as a smartphone, could advantageously be used, which portable computer serves both as a readout unit 16 and as a display unit 17. As a result, the information can also be read in a simple manner at locations that are difficult to access. In a similar manner, a known tactile measuring sensor could also be used as a readout unit 16, which tactile measuring sensor can be designed for example to detect a geometric parameter such as, for example, the welding seam thickness ND or the welding seam width NB as a detectable external physical welding seam property and to transmit it to an evaluation unit 17. The evaluation unit 17 can read the stored information from the detected variables, for example from a sequence of values of the welding seam width NB or welding seam thickness ND along the seam course of the seam.

In addition to a welding seam N with which two or more components 5 are bonded, one or more marking welding seams (not shown) could also be produced on one or more components 5, which marking welding seams are not used for material cohesive bonding. Such marking seams can be produced, for example, with the known build-up welding method. Of course, information can also be stored in such marking seams using the method according to the invention. For this purpose, in an analogous manner as described with reference to the production of the welding seam N, information can be taken into consideration for the at least one control parameter, said information during the process of producing the marking welding seam being stored in the marking welding seam between an information start point and an information end point using the at least one detectable external physical welding seam property. The information is stored in such a way that the information can be read, preferably optically and/or haptically, from a sequence of the at least one detectable external physical welding seam property along the seam course of the seam of the marking welding seam in the region between the information start point and the information end point.

However, a welding seam N, with which two or more components 5 are bonded, could also have, for example, marking seam sections that are not used for bonding, but merely for marking. Information can of course also be stored in such marking seam sections. For this purpose, in turn, information can be taken into consideration for the at least one control parameter, said information during the process of producing the marking seam section of the welding seam N being stored in the welding seam N between an information start point and an information end point in the seam course of the marking seam section using the at least one detectable external physical welding seam property. The information can then in turn be read, preferably optically and/or haptically, from a sequence of the at least one detectable external physical welding seam property along the seam course of the seam in the region between the information start point and the information end point of the marking seam section.

The invention claimed is:

1. A welding method, comprising:

producing a welding seam cohesively bonding at least two components, the welding seam being produced with a specified seam course between a seam start and a seam end and comprising at least one additive material;

controlling the producing of the welding seam by at least one control unit, wherein the welding seam further comprises at least one detectable external physical welding seam property that is influenced by at least one control parameter of the control unit, and the at least one control parameter includes information that, during the producing of the welding seam, is stored in the welding seam between an information start point and an information end point in the seam course using the at least one detectable external physical welding seam property so that the information is readable from a sequence of the at least one detectable external physical welding seam property along the seam course in the region between the information start point and the information end point, and wherein during the producing of the welding seam, the method further comprises varying the at least one control parameter in order to change the at least one detectable external physical welding seam property in the seam course between the information start point and the information end point, wherein different forms of the at least one external physical welding seam property are assigned to code letters of a code alphabet and the information is stored as a combination of the code letters of the code alphabet.

2. The welding method according to claim 1, the information is stored in the form of a machine-readable digital code so that the information is readable by a readout unit from the sequence of the at least one detectable external physical welding seam property.

3. The welding method according to claim 2, wherein the information is readable by a contactless scanner, at least one camera or a measuring probe.

4. The welding method according to claim 2, wherein the digital code is a multi-value code.

5. The welding method according to claim 4, wherein the multi-value code comprises a binary code or a ternary code.

6. The welding method according to claim 4, wherein the measurable geometric parameter of the welding seam comprises a welding seam thickness, a welding seam width, a welding seam length of sections of the welding seam.

7. The welding method according to claim 4, wherein the welding seam length of the sections of the welding seam comprises a welding scale length of welding scales or a length of a region of the welding seam without the at least one additive material.

8. The welding method according to claim 1, a measurable geometric parameter of the welding seam is used as the at least one detectable external physical welding seam property.

9. The welding method according to claim 1, the information includes method data relating to the control parameters used of the welding method, which method data is used to produce the welding seam or reference information assigned to the method data and/or that the information contains external data independent of the welding method or reference information assigned to the external data.

10. The welding method according to claim 9, the method data includes data on welding parameters used, which data is used to produce the welding seam.

11. The welding method according to claim 10, wherein the data on welding parameters used comprises at least one of data on a welding current and/or a welding voltage and/or a feed rate of the additive material and/or a pulse frequency of a welding current and/or a number of welding cycles and/or a duration of welding cycles.

12. The welding method according to claim 1, the information is stored in the control unit and/or that the information is transmitted to the control unit before the welding method is carried out and/or that the information is transmitted by an input unit to the control unit and/or that the information is converted to a digital code by the control unit.

13. The welding method according to claim 1, an arc welding method with a consumable or non-consumable electrode, a laser welding method or an electron beam welding method is used as the welding method.

14. The welding method according to claim 1, a marking welding seam is produced on at least one of the components by build-up welding, wherein information is included in the at least one control parameter, said information during the process of producing the marking welding seam being stored in the marking welding seam between an information start point and an information end point in the seam course of the welding seam using the at least one detectable external physical welding seam property so that the information is readable from a sequence of the at least one detectable external physical welding seam property along the seam course in the region between the information start point and the information end point.

15. The welding method according to claim 14, wherein the information is readable at least one of optically and/or haptically.

16. The welding method according to claim 1, a marking seam section not used for the materially cohesively bonding is provided in the welding seam, wherein information is included in the at least one control parameter, said information during the producing of the marking seam section of the welding seam being stored in the welding seam between an information start point and an information end point in the seam course of the marking seam section using the at least one detectable external physical welding seam property so that the information is readable from a sequence of the at least one detectable external physical welding seam property along the seam course of the seam in the region between the information start point and the information end point.

17. The welding method according to claim 16, wherein the information is readable at least one of optically and/or haptically.

18. The welding method according to claim 1, wherein the information is readable at least one of optically and/or haptically.

* * * * *